United States Patent
Anderson et al.

(10) Patent No.: US 10,171,509 B2
(45) Date of Patent: Jan. 1, 2019

(54) FILTERING AND REDACTING BLOCKCHAIN TRANSACTIONS

(71) Applicant: International Business Machines Corporation, Armonk, NY (US)

(72) Inventors: Sheehan Anderson, Morrisville, NC (US); Binh Q. Nguyen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/348,581

(22) Filed: Nov. 10, 2016

(65) Prior Publication Data
US 2018/0131706 A1 May 10, 2018

(51) Int. Cl.
*H04L 29/06* (2006.01)
*H04L 9/32* (2006.01)

(52) U.S. Cl.
CPC ............ *H04L 63/20* (2013.01); *H04L 9/32* (2013.01)

(58) Field of Classification Search
CPC .............. H04L 63/1416; H04L 63/1425
See application file for complete search history.

(56) References Cited

U.S. PATENT DOCUMENTS

| | | | | |
|---|---|---|---|---|
| 9,274,710 B1 * | 3/2016 | Oikarinen | ............. | G06F 3/061 |
| 9,779,015 B1 * | 10/2017 | Oikarinen | ............. | G06F 12/02 |
| 2005/0131782 A1 * | 6/2005 | Thuneby | ............. | G06Q 40/00 705/30 |
| 2005/0234786 A1 * | 10/2005 | Aggarwal | ............. | G06Q 10/087 705/30 |
| 2011/0246503 A1 * | 10/2011 | Bender | ............. | G06F 17/30306 707/769 |
| 2012/0084135 A1 | 4/2012 | Nissan | | |
| 2013/0080301 A1 * | 3/2013 | Siauw | ............. | G06Q 40/02 705/30 |
| 2013/0290655 A1 * | 10/2013 | Fang | ............. | G06F 17/30377 711/156 |
| 2014/0351943 A1 | 11/2014 | Gianniotis | | |
| 2015/0237127 A1 * | 8/2015 | Khemani | ............. | H04L 67/1095 707/625 |
| 2015/0277802 A1 * | 10/2015 | Oikarinen | ............. | G06F 3/0631 711/114 |
| 2015/0277969 A1 * | 10/2015 | Strauss | ............. | G06F 9/466 707/703 |
| 2015/0278243 A1 * | 10/2015 | Vincent | ............. | G06F 17/30194 707/634 |
| 2015/0278397 A1 * | 10/2015 | Hendrickson | ............. | G06F 17/30958 707/798 |

(Continued)

OTHER PUBLICATIONS

IBM, Method & System to Filter, Analyze and Statistics Transaction's Performance of Database, Jul. 17, 2007.

(Continued)

*Primary Examiner* — David Garcia Cervetti

(57) ABSTRACT

A blockchain may store transactions which should were not intended to be recorded due to inappropriate content or unwanted subject matter submitted by malicious users. A method may also include one or more of identifying a blockchain transaction, processing content of the blockchain transaction to identify prohibited content, and determining whether to approve or disapprove the blockchain transaction based on the content of the blockchain transaction.

12 Claims, 5 Drawing Sheets

(56) References Cited

U.S. PATENT DOCUMENTS

| | | | | |
|---|---|---|---|---|
| 2015/0280959 | A1* | 10/2015 | Vincent | H04L 67/1097 |
| | | | | 709/203 |
| 2016/0218879 | A1 | 7/2016 | Ferrin | |
| 2016/0260169 | A1* | 9/2016 | Arnold | G06Q 40/12 |
| 2016/0342976 | A1* | 11/2016 | Davis | G06Q 20/3829 |
| 2016/0342978 | A1* | 11/2016 | Davis | G06Q 20/02 |
| 2016/0342989 | A1* | 11/2016 | Davis | G06Q 20/385 |
| 2016/0342994 | A1* | 11/2016 | Davis | G06Q 20/027 |
| 2017/0046709 | A1* | 2/2017 | Lee | G06Q 20/0655 |
| 2017/0053249 | A1* | 2/2017 | Tunnell | G06F 21/316 |
| 2017/0098291 | A1* | 4/2017 | Code | G06Q 40/02 |
| 2017/0132630 | A1* | 5/2017 | Castinado | G06Q 20/4014 |
| 2017/0140408 | A1* | 5/2017 | Wuehler | G06Q 30/0207 |
| 2017/0177855 | A1* | 6/2017 | Costa Faidella | G06F 21/45 |
| 2017/0193464 | A1* | 7/2017 | Sher | G06Q 20/065 |
| 2017/0220815 | A1* | 8/2017 | Ansari | G06F 21/64 |
| 2017/0236102 | A1* | 8/2017 | Biton | G06Q 20/065 |
| | | | | 705/64 |
| 2017/0236103 | A1* | 8/2017 | Biton | G06Q 20/065 |
| | | | | 705/64 |
| 2017/0236104 | A1* | 8/2017 | Biton | G06Q 20/065 |
| | | | | 705/64 |
| 2017/0243177 | A1* | 8/2017 | Johnsrud | G06Q 20/10 |
| 2017/0243209 | A1* | 8/2017 | Johnsrud | G06Q 20/40 |
| 2017/0243212 | A1* | 8/2017 | Castinado | G06Q 20/401 |
| 2017/0262778 | A1* | 9/2017 | Ganesan | H04L 9/3247 |
| 2017/0279783 | A1* | 9/2017 | Milazzo | H04L 63/061 |
| 2017/0293669 | A1* | 10/2017 | Madhavan | G06F 17/30578 |
| 2017/0295023 | A1* | 10/2017 | Madhavan | H04L 9/3247 |
| 2017/0337534 | A1* | 11/2017 | Goeringer | G06Q 20/02 |
| 2017/0344580 | A1* | 11/2017 | King | G06F 17/30097 |
| 2017/0346693 | A1* | 11/2017 | Dix | H04L 9/3247 |
| 2017/0353309 | A1* | 12/2017 | Gray | G06F 21/53 |
| 2017/0372308 | A1* | 12/2017 | Metnick | G06Q 20/10 |
| 2017/0372391 | A1* | 12/2017 | Metnick | G06Q 30/0613 |
| 2018/0040040 | A1* | 2/2018 | Barski | G06Q 30/0601 |
| 2018/0040041 | A1* | 2/2018 | Metnick | G06Q 30/0609 |
| 2018/0046889 | A1* | 2/2018 | Kapinos | G06F 21/00 |
| 2018/0053158 | A1* | 2/2018 | White | G06Q 20/227 |
| 2018/0089638 | A1* | 3/2018 | Christidis | G06Q 20/02 |
| 2018/0089758 | A1* | 3/2018 | Stradling | G06Q 20/3829 |
| 2018/0089760 | A1* | 3/2018 | Stradling | G06Q 20/3829 |
| 2018/0089761 | A1* | 3/2018 | Stradling | G06Q 20/3829 |
| 2018/0091316 | A1* | 3/2018 | Stradling | G06Q 20/3829 |
| 2018/0096042 | A1* | 4/2018 | Kuzma | G06F 17/30424 |
| 2018/0096347 | A1* | 4/2018 | Goeringer | G06Q 20/3825 |
| 2018/0096360 | A1* | 4/2018 | Christidis | G06Q 30/018 |
| 2018/0101906 | A1* | 4/2018 | McDonald | G06Q 40/04 |

OTHER PUBLICATIONS

Anonymously; A novel method and programs to get an effective Thresholds for detecting unusual situations and fo filtering usual fluctuations of response times of non-independent transactions, Nov. 22, 2011.

* cited by examiner

300

FILTERING AND REDACTING BLOCKCHAIN TRANSACTIONS

TECHNICAL FIELD

This application relates to auditing transactions in a blockchain, and more particularly, to filtering and if appropriate, redacting blockchain transactions based on a transaction approval procedure.

BACKGROUND

In a blockchain, each block contains zero or more transactions. These transactions include data defined, at least in part, by the sender of the transaction. While this data is usually innocuous and relates to the execution of the transaction, it is possible for a malicious user to include data that may be offensive or illegal. Existing blockchains do not have ways of detecting such harmful data included in a transaction. If the transaction is otherwise valid and passes consensus, all blockchain participants will be, in turn, hosting a copy of this data whether it be valid or malicious. Since immutability is a property of blockchains, removing such harmful data from the transaction would be a benefit.

SUMMARY

One example embodiment may include a method that comprises one or more of identifying a blockchain transaction, processing content of the blockchain transaction to identify prohibited content, determining whether to approve or disapprove the blockchain transaction based on the content of the blockchain transaction.

Another example embodiment may include a system that comprises a processor and memory, wherein the processor and memory are communicably coupled to one another, wherein the processor is configured to perform one or more of identify a blockchain transaction, process content of the blockchain transaction to identify prohibited content, and determine whether to approve or disapprove the blockchain transaction based on the content of the blockchain transaction.

A further example embodiment may include a non-transitory computer readable medium comprising instructions, that when read by a processor, cause the processor to perform one or more of identifying a blockchain transaction, processing content of the blockchain transaction to identify prohibited content, and determining whether to approve or disapprove the blockchain transaction based on the content of the blockchain transaction.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a process that receives incoming blockchain transactions from various nodes operating on a network. These transactions, which may be financial, can be filtered and/or redacted based on a transaction approval procedure. In other embodiments, other types of blockchain transactions may also be received and processed (filtered and/or redacted) for storage in the blockchain. The transactions are received via an ingress platform which applies filtering based on pre-defined criteria. If the blockchain transaction content of an incoming transaction is suspect based on the filtering, then the message may be quarantined, deleted, forwarded to a computer or an administrator for review or sent back to the transaction originator along with a notification regarding the type of error which was noted and/or logged during the filtering process. In addition, even after transactions are received and logged, another procedure may perform redaction of the transactions in the blockchain based on a further audit process (which may be on-going) that seeks to identify improperly logged transactions.

Figure 1:
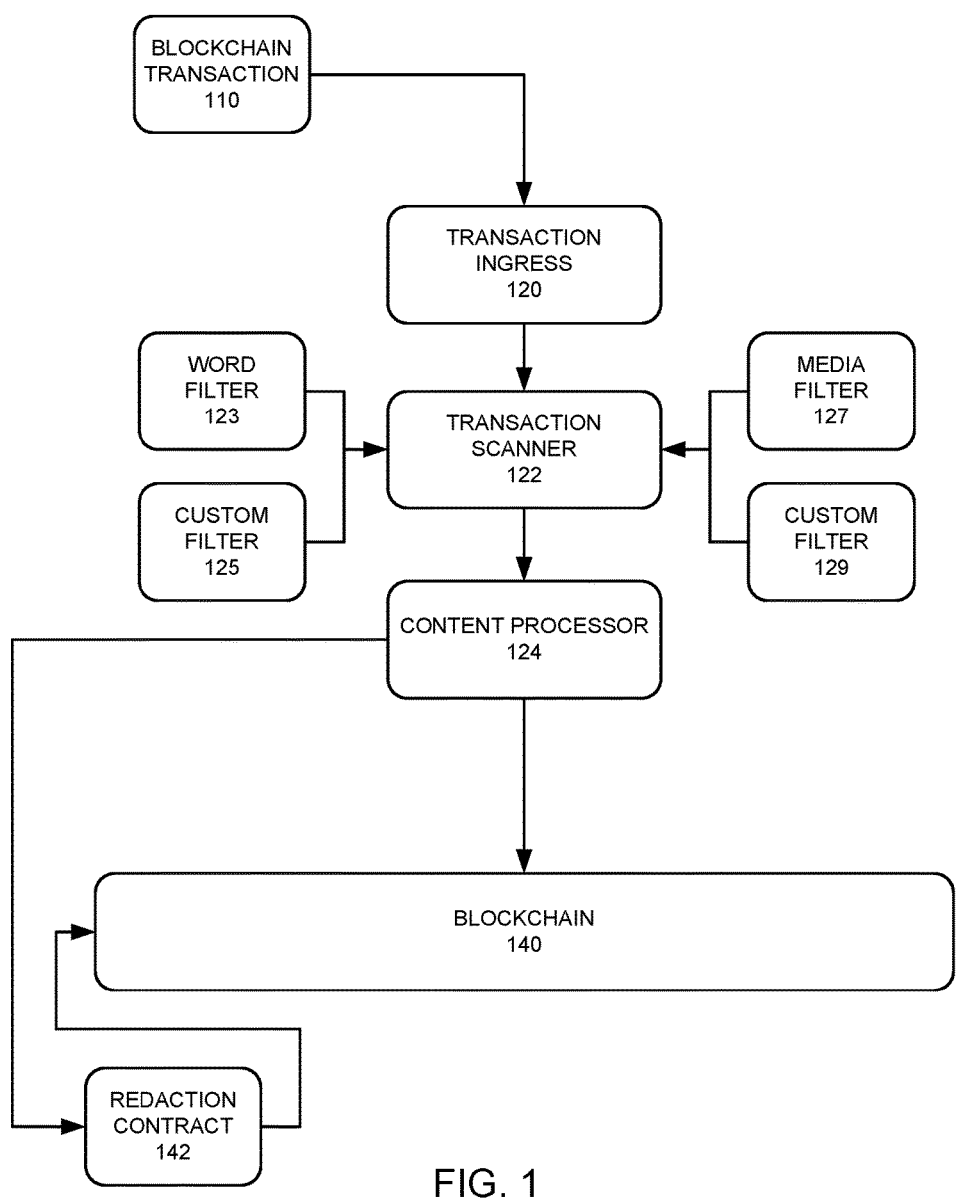
FIG. 1 illustrates a logic block diagram of a blockchain transaction tracking and node characterization configuration according to example embodiments.

FIG. 1 illustrates a logic block diagram of a blockchain transaction tracking and node characterization configuration according to example embodiments. Referring to FIG. 1, the transaction processing logic is illustrated 100 as receiving and processing incoming blockchain transactions 110. The transaction ingress 120 may be a platform for receiving transactions at a blockchain pre-processing server and which identifies whether the transaction should be screened based on various filters and/or customized examination processes. A transaction scanning module or processor 122 may be configured to parse words, symbols and other content included in the transaction to detect offensive or illegal data included in blockchain transaction. A library of known terms, spam, media, links, etc., which are likely to be inappropriate or unrelated to the content of a typical transaction may be used to flag the transaction information which is likely unacceptable for logging in the blockchain. Filters may include word filters 123, custom filters 125 and 129 which are setup by the administrators and other users, and a media filter 127 which seeks to identify videos, audio, images, symbols, etc. The content processor 124 may receive and process the transaction content and determine whether the content should be stored in the blockchain 140. The content in the blockchain may be redacted based on a further audit process by a redaction contract 142 that seeks to identify improperly logged transactions. In another embodiment, the redaction contract 142 (which may reside on a computer with a processor and memory) can receive transaction information from the blockchain 140, determine whether the content should be stored in the blockchain 140 and if not, redact the content based on a further audit process by the redaction contract 142.

When redacting a transaction, the data that was originally identified in the transaction may be hidden or blocked from view in the actual committed blockchain transaction. For example, once a transaction is identified as requiring redaction, the transaction may still exist in a block to preserve immutability of that transaction, however, the transaction may be otherwise inaccessible and cannot be accessed or viewed by users. For example, one approach may include placing a contract in a genesis block of the blockchain with code indicating to record redacted transactions. Additionally, by sending a new transaction to the redaction contract identifying a particular blockchain transaction to be redacted, the new transaction may be recorded and a redaction procedure may identify the "improper transaction" as the transaction to be redacted on the blockchain.

There are a number of operations/approaches to limiting improper blockchain transactions. One approach is to filter and discard/stop a transaction prior to the transaction being committed to the blockchain, and possibly redact, if necessary, transactions from blockchain. The offensive/improper transactions can be identified prior to being committed into the blockchain. Another approach is to redact a transaction after it has entered the blockchain. This will not change the immutability property of the blockchain, but instead, provides a way to limit access or hide the transaction so that even though the transaction still exits, it is not accessible or viewable by the users.

Figure 2:
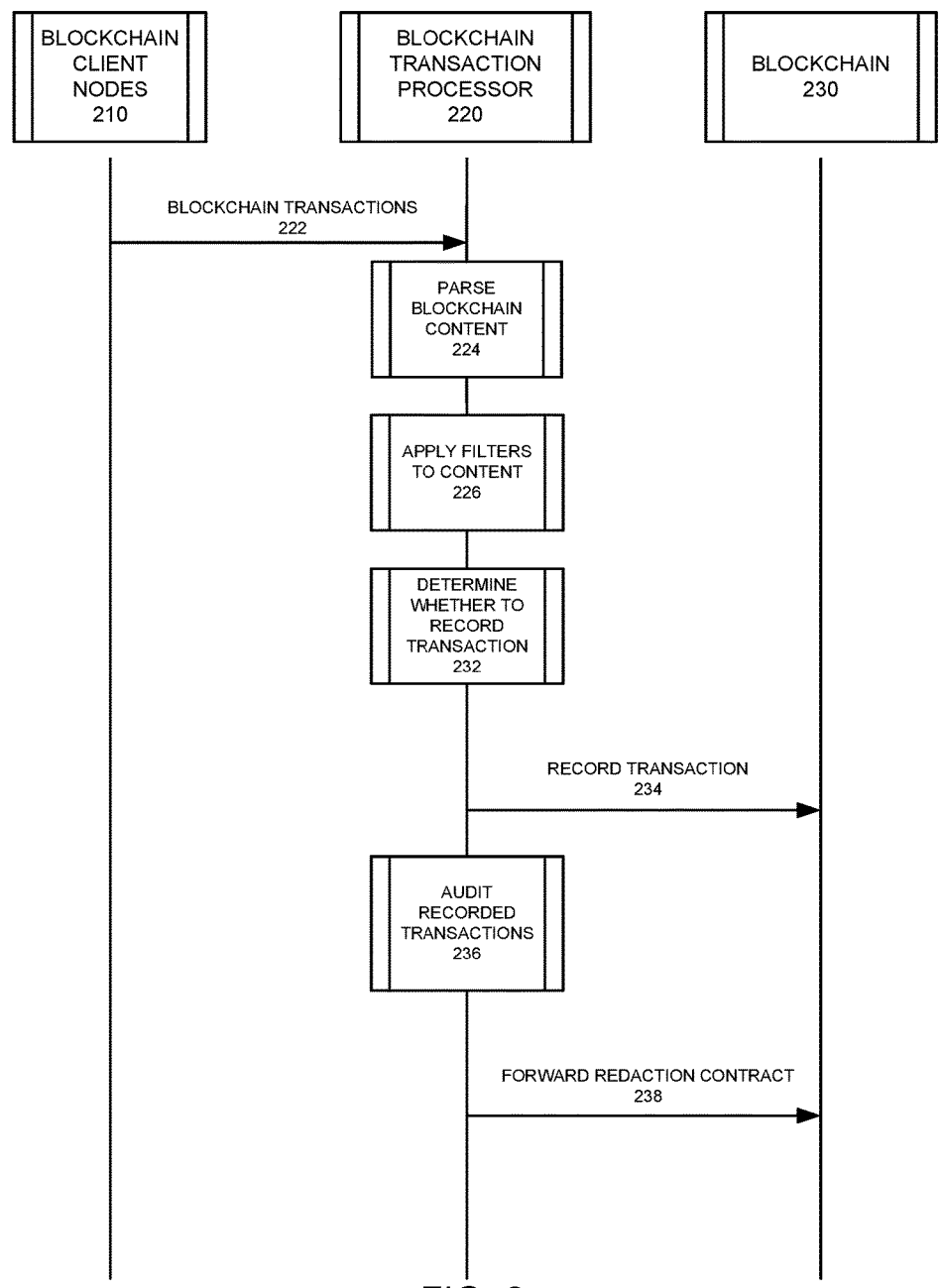
FIG. 2 illustrates a system signaling diagram of a blockchain transaction tracking configuration according to example embodiments.

FIG. 2 illustrates a system signaling diagram of a blockchain transaction tracking configuration according to example embodiments. Referring to FIG. 2, the system diagram 200 includes blockchain nodes 210 attempting to submit blockchain transactions to a processor or blockchain computing device 220 which receives the transactions 222, parses the content 224 and attempts to screen the content for certain predefined parameters. In one example, when a transaction arrives at the ingress, the transaction will be sent through a set of filters 226 and processes where the transaction content can be scanned for offensive or illegal content based on the established filters. If the transaction is "approved" 232, it will continue to be forwarded to the blockchain for recording/commitment 234. The transaction ingress where the transactions are received are managed by an extendable framework such that filters may be set via a plug-in. For example, some filters may attempt to identify specific keywords or images and some filters may be human processes to moderate and approve a transaction. The result of the filters and processes is a determination whether to accept or reject the transaction. If an offensive transaction managed to get past the filters and become committed to the blockchain, the transaction becomes immutable and should be blocked and limited after the commitment. In order to identify and enforce the contract, the contract is stored in a genesis block with code that can record transactions that should be redacted. This contract may be called the redact transaction contract. The redact transaction contract is retrievable by users who are authorized to redact transactions, such as administrators or other operators. When a transaction needs to be redacted 236, a new transaction is sent to the redact transaction contract describing which transaction should be redacted and the reasons why it should be redacted. The redact transaction contract will update its list of contracts that should be redacted 238. The redact transaction, like any other blockchain transaction, is recorded on the blockchain and serves as evidence that the members agreed to redact the transaction in question.

Members of the network can select to automatically redact transactions based on a list of noted improper transactions. Once a transaction is added to the list, the peer nodes on the network will no longer expose the contents of the transaction via user API calls. A message will be returned indicating that the transaction has been redacted and is no longer available for public viewing. Peer-to-peer API calls may still include the transaction to maintain the immutability of the blockchain.

Figure 3A:
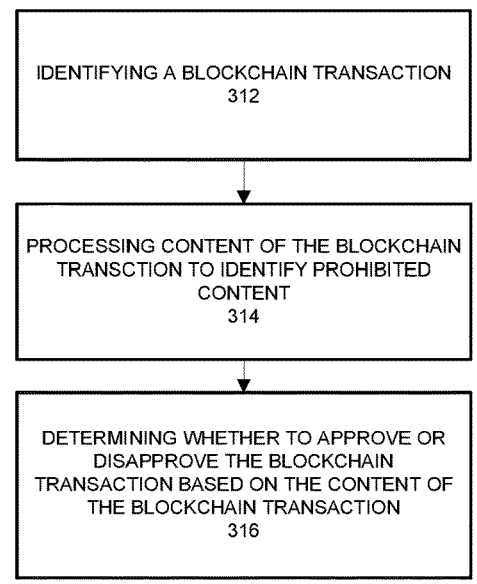
FIG. 3A illustrates a flow diagram of an example method of operation according to example embodiments.

FIG. 3A illustrates a flow diagram of an example method of operation according to example embodiments. Referring to FIG. 3A, the method 300 may include one or more of identifying a blockchain transaction 312, processing content of the blockchain transaction to identify prohibited content 314, and determining whether to approve or disapprove the blockchain transaction based on the content of the blockchain transaction 316. Additionally, the method may also include determining that the content of the blockchain transaction is approved, and logging the blockchain transaction in the blockchain. The method may also include determining that the content of the blockchain is disapproved, and denying the blockchain transaction from being logged in the blockchain, as well as determining that the content is disapproved after the transaction is logged in the blockchain, and denying access to the blockchain transaction logged in the blockchain. The method may also include determining that the content is disapproved after the blockchain transaction is logged in the blockchain, determining to redact the transaction, and redacting the blockchain transaction logged in the blockchain. Redacting the blockchain transaction includes creating and storing a transaction redaction contract in a genesis block of the blockchain. The method may further include creating a redaction transaction responsive to determining to redact the blockchain transaction, responsive to receiving the redaction transaction, updating the transaction redaction contract to include a list of contracts identified as redacted including the blockchain transaction, and logging the redaction transaction on the blockchain.

Figure 3B:
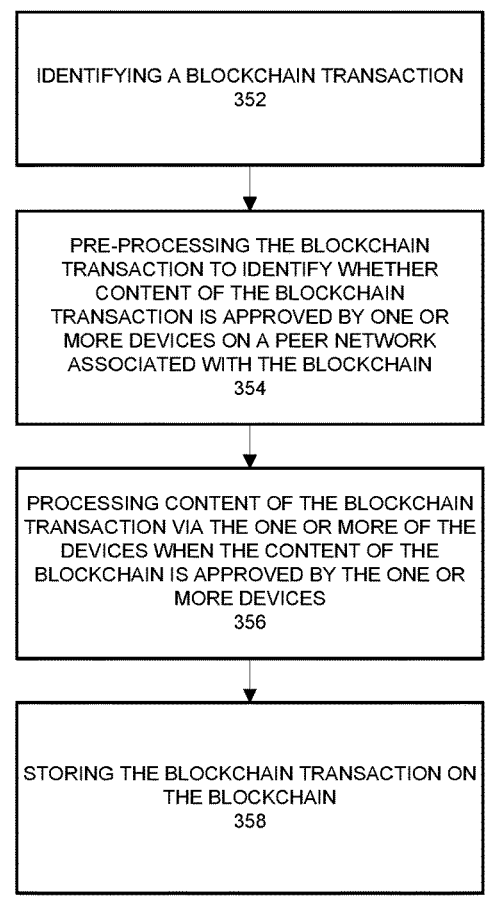
FIG. 3B illustrates a flow diagram of an example method of operation according to example embodiments.

FIG. 3B illustrates a flow diagram of an example method of operation according to example embodiments. Referring to FIG. 3B, the method 350 may also include identifying a blockchain transaction 352, pre-processing the blockchain transaction to identify whether content of the blockchain transaction is approved by one or more devices on a peer network associated with the blockchain 354, processing content of the blockchain transaction via the one or more of the devices when the content of the blockchain is approved by the one or more devices 356, and storing the blockchain transaction on the blockchain 358. In this example, a pre-processing operation confirms the content of the transaction is recognizable or expected by potential miner devices on the peer network prior to committing a transaction that should not be permitted. This way, if a transaction contains unexpected content, the pre-processing will identify this content and it will not be finalized or stored in the blockchain. As such, miner devices have their own filter for approving content (or not) and a consensus may be reached regarding the acceptance of content of a transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
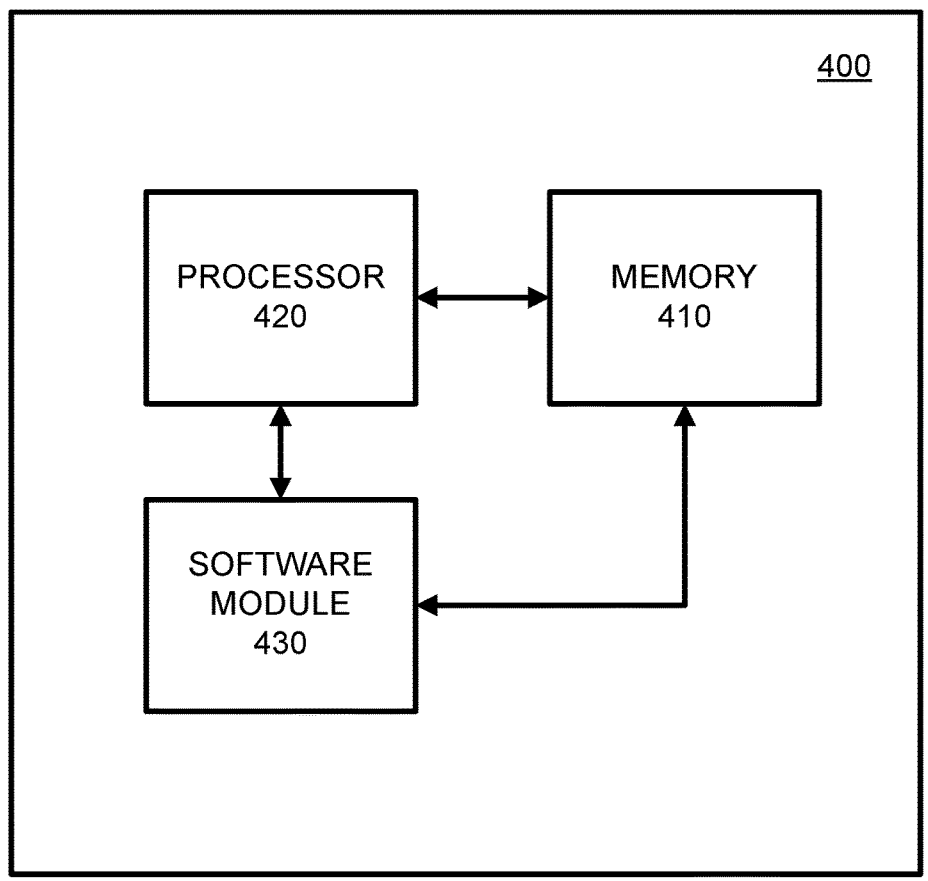
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
identifying a blockchain transaction;
processing content of the blockchain transaction to identify prohibited content;
determining whether to approve or disapprove the blockchain transaction based on the content of the blockchain transaction;
determining that the content is disapproved after the blockchain transaction is logged in a blockchain;
determining to redact the blockchain transaction; and
redacting the blockchain transaction logged in the blockchain by creating and storing a transaction redaction contract in a genesis block of the blockchain.

2. The method of claim 1, further comprising:
logging the blockchain transaction in the blockchain.

3. The method of claim 1, further comprising:
denying access to the blockchain transaction logged in the blockchain.

4. The method of claim 1, further comprising:
creating a redaction transaction responsive to determining to redact the transaction;
responsive to receiving the redaction transaction, updating the transaction redaction contract to include a list of contracts identified as redacted including the blockchain transaction; and
logging the redaction transaction on the blockchain.

5. A system, comprising:
a processor; and
memory, wherein the processor and memory are communicably coupled to one another;
wherein the processor is configured to:
identify a blockchain transaction;
process content of the blockchain transaction to identify prohibited content; and
determine whether to approve or disapprove the blockchain transaction based on the content of the blockchain transaction;
determine that the content is disapproved after the blockchain transaction is logged in a blockchain;
determine to redact the blockchain transaction; and
create and store a transaction redaction contract in a genesis block of the blockchain to redact the blockchain transaction logged in the blockchain.

6. The system of claim 5, wherein the processor is configured to:
log the blockchain transaction in the blockchain.

7. The system of claim 5, wherein the processor is configured to:
deny access to the blockchain transaction logged in the blockchain.

8. The system of claim 5, wherein the processor is configured to:
create a redaction transaction responsive to the determination to redact the transaction;
responsive to receipt of the redaction transaction, update the transaction redaction contract to include a list of contracts identified as redacted including the blockchain transaction; and
log the redaction transaction on the blockchain.

9. A non-transitory computer readable medium comprising instructions, that when read by a processor, cause the processor to perform:
identifying a blockchain transaction;
processing content of the blockchain transaction to identify prohibited content;
determining whether to approve or disapprove the blockchain transaction based on the content of the blockchain transaction;
determining that the content is disapproved after the blockchain transaction is logged in a blockchain;
determining to redact the blockchain transaction; and
redacting the blockchain transaction logged in the blockchain by creating and storing a transaction redaction contract in a genesis block of the blockchain.

10. The non-transitory computer readable medium of claim 9, comprising instructions, that when read by the processor, cause the processor to perform:
logging the blockchain transaction in the blockchain.

11. The non-transitory computer readable medium of claim 9, comprising instructions, that when read by the processor, cause the processor to perform:
denying access to the blockchain transaction logged in the blockchain.

12. The non-transitory computer readable medium of claim 9, further comprising:
creating a redaction transaction responsive to determining to redact the transaction;
responsive to receiving the redaction transaction, updating the transaction redaction contract to include a list of contracts identified as redacted including the blockchain transaction; and
logging the redaction transaction on the blockchain.

* * * * *